(12) United States Patent
Pankok, Jr. et al.

(10) Patent No.: US 11,484,737 B2
(45) Date of Patent: Nov. 1, 2022

(54) AUTOMATED WATER VOLUME ESTIMATION

(71) Applicant: LOCKHEED MARTIN CORPORATION, Bethesda, MD (US)

(72) Inventors: Carl John Pankok, Jr., Philadelphia, PA (US); Michael Paul Baran, Prospect, CT (US); Sean Scott Carlson, New Milford, CT (US); George Nicholas Loussides, West Haven, CT (US); Alexander Quinn Weintraub, Wilton, CT (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 316 days.

(21) Appl. No.: 16/886,828

(22) Filed: May 29, 2020

(65) Prior Publication Data

US 2021/0370110 A1    Dec. 2, 2021

(51) Int. Cl.
| | | |
|---|---|---|
| A62C 3/02 | (2006.01) |
| B64D 1/16 | (2006.01) |
| G05D 1/10 | (2006.01) |
| B64C 27/12 | (2006.01) |
| G08G 5/00 | (2006.01) |
| B64D 1/22 | (2006.01) |
| G06V 20/10 | (2022.01) |

(52) U.S. Cl.
CPC ............ *A62C 3/0235* (2013.01); *B64C 27/12* (2013.01); *B64D 1/16* (2013.01); *B64D 1/22* (2013.01); *G05D 1/106* (2019.05); *G06V 20/182* (2022.01); *G08G 5/003* (2013.01); *G08G 5/0047* (2013.01)

(58) Field of Classification Search
CPC .... A62C 3/0235; G05D 1/106; G06V 20/182; B64C 27/12; B64D 1/16; B64D 1/22; G08G 5/003; G08G 5/0047
See application file for complete search history.

(56) References Cited

U.S. PATENT DOCUMENTS

| | | | |
|---|---|---|---|
| 4,277,167 A | 7/1981 | Eppel | |
| 8,307,705 B2 | 11/2012 | Ullrich et al. | |
| 2014/0239123 A1* | 8/2014 | Hoisington | A62C 3/0235 244/136 |
| 2014/0240147 A1* | 8/2014 | Goda | A62C 3/0292 340/945 |
| 2015/0049326 A1 | 2/2015 | Lundquist | |
| 2017/0072234 A1* | 3/2017 | Álvarez | B64D 1/16 |
| 2017/0184399 A1 | 6/2017 | Thayer et al. | |
| 2019/0168873 A1* | 6/2019 | Wiplinger | B64D 37/16 |
| 2020/0239140 A1* | 7/2020 | Klein | B64D 1/18 |

FOREIGN PATENT DOCUMENTS

EP    2921879 A1    9/2015

* cited by examiner

*Primary Examiner* — Hussein Elchanti
(74) *Attorney, Agent, or Firm* — Foley & Lardner LLP (57) ABSTRACT

According to an aspect, a computer-implemented method for water volume estimation includes detecting water based at least in part on sensor-based data; determining a volume of water based at least in part on the sensor-based data; determining a location at the water for an aircraft to retrieve water via a water retrieving apparatus; and translating the location of the water into pilot inputs to guide the aircraft to the water.

20 Claims, 5 Drawing Sheets

AUTOMATED WATER VOLUME ESTIMATION

BACKGROUND

Exemplary embodiments relate to computer-based detection systems, and more particularly, to automated water volume estimation.

Aerial firefighting aircraft are fitted with water storage reservoirs, including large tanks or buckets, to transport and release large quantities of water over a fire. The tanks and buckets are filled or refilled by the water in nearby lakes, rivers, streams, or other bodies of water. Once a bucket or tank is empty, the aircraft needs to be redirected from a fire to an available body of water. Vital time may be saved if aircraft systems were in place to detect water as an aircraft is headed towards a fire. Furthermore, as aircraft transition to pilot optional flight control systems, firefighting aircraft must be equipped with the operational capability to autonomously detect available water and direct the aircraft from the fire to the water.

BRIEF DESCRIPTION

According to one embodiment, a computer-implemented method for water volume estimation includes detecting water based at least in part on sensor-based data; determining a volume of water based at least in part on the sensor-based data; determining a location at the water for an aircraft to retrieve water via a water retrieving apparatus; and translating the location of the water into pilot inputs to guide the aircraft to the water.

In addition to one or more of the features described above or below, or as an alternative, the method further includes comparing the determined volume of water to a threshold capacity of a water storage reservoir on the aircraft; and determining the location based on the volume exceeding the threshold capacity of the water storage reservoir.

In addition to one or more of the features described above or below, or as an alternative, the method further includes receiving the sensor-based data from a sensor arranged on the aircraft.

In addition to one or more of the features described above or below, or as an alternative, the method further includes detecting a distance between the aircraft and a fire; and activating the processor based on the distance being less than a threshold distance to the fire.

In addition to one or more of the features described above or below, or as an alternative, the water retrieving apparatus comprises a snorkel.

In addition to one or more of the features described above or below, or as an alternative, the location is based at least in part on a characteristic of the water.

In addition to one or more of the features described above or below, or as an alternative, the location is based at least in part on a depth of the water.

In addition to one or more of the features described above or below, or as an alternative, the method further includes extracting a water-related feature from the terrain-related data; and applying the water-related feature to model to detect the water.

In addition to one or more of the features described above or below, or as an alternative, the sensor-based data is generated by a light detection and ranging-based sensor.

According to another embodiment, an aircraft includes a main rotor system; a flight control system for controlling the main rotor system; an airframe; a memory having computer readable instructions; and one or more processors for executing the computer readable instructions, the computer readable instructions controlling the one or more processors to perform operations comprising: detecting water based on sensor-based data; determining a volume of water based at least in part on the sensor-based data; determining a location at the water for an aircraft to retrieve water via a water retrieving apparatus; and translating the location of the water into pilot inputs for the flight control system to guide the aircraft to the water.

In addition to one or more of the features described above or below, or as an alternative, the operations further include comparing the determined volume of water to a threshold capacity of a water storage reservoir on the aircraft; and determining the location based on the volume exceeding the threshold capacity of the water storage reservoir.

In addition to one or more of the features described above or below, or as an alternative, the operations further include receiving the sensor-based data from a sensor arranged on the airframe.

In addition to one or more of the features described above or below, or as an alternative, the operations further include detecting a distance between the aircraft and a fire; and activating the processor based on the distance being less than a threshold distance to the fire.

In addition to one or more of the features described above or below, or as an alternative, the water retrieving apparatus comprises a snorkel.

In addition to one or more of the features described above or below, or as an alternative, the location is based at least in part on a characteristic of the water.

In addition to one or more of the features described above or below, or as an alternative, the location is based at least in part on a depth of the water.

In addition to one or more of the features described above or below, or as an alternative, the operations further include extracting a water-related feature from the terrain-related data; and applying the water-related feature to model to detect the water.

In addition to one or more of the features described above or below, or as an alternative, the sensor-based data is generated by a light detection and ranging-based sensor.

In addition to one or more of the features described above or below, or as an alternative, the pilot inputs are based at least in part on a type of water retrieving apparatus.

In addition to one or more of the features described above or below, or as an alternative, the operations further include controlling, by the flight control system, the main rotor system based at least in part on the pilot inputs.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

Figure 1:
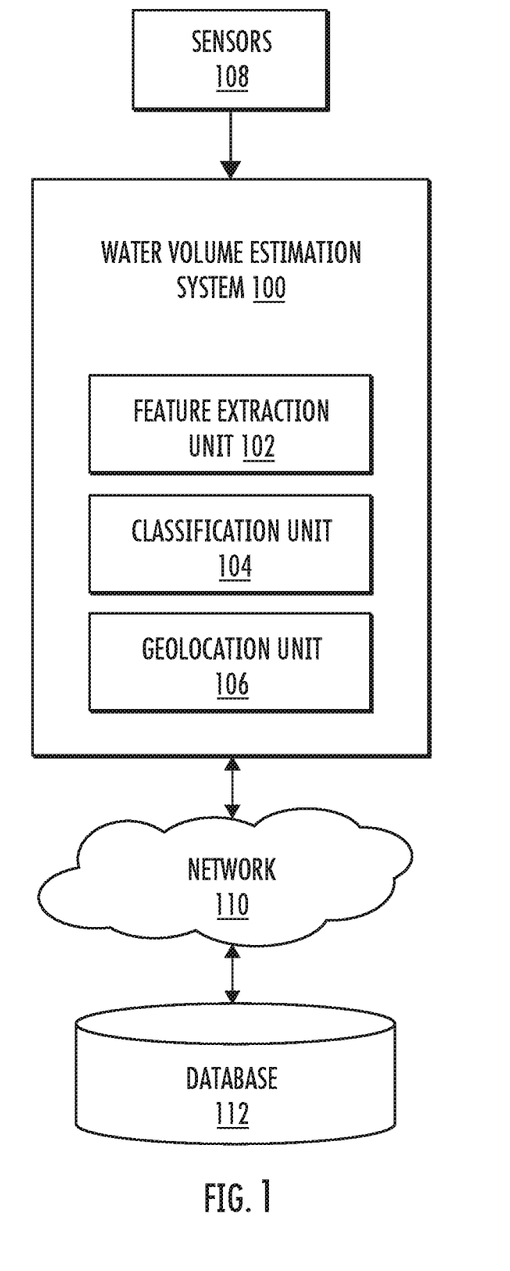
FIG. 1 depicts a water volume estimation system, in accordance with an exemplary embodiment.

FIG. 1 illustrates a water volume estimation system 100 operable to receive real-time data to detect water and estimate a volume of the water to determine whether the volume is sufficient to fill an aircraft's water reservoir. The data may include multiple objects, and the objects may or may not include water. Therefore, the system 100 may continuously analyze the real-time data to detect and identify distinct objects described in the data. The system 100 may compare the volume to a holding capacity of the aircraft's reservoir to determine whether to guide the aircraft to the water. By using the real-time data, the system 100 may account for changes in water conditions, temporary obstacles between an aircraft and water, and other time-dependent conditions that may not be readily discerned by visual inspection or described in static data.

The system 100 includes a feature extraction unit 102 that, in combination with a classification unit 104 receives data to identify water and determine the volume of the water. The feature extraction unit 102 is operable to receive the data and extract features related to an identity and a boundary of respective objects described in the data. To perform this operation, the feature extraction unit 102 may reduce the data to a numerical representation and extract features from the representation. Each feature includes its own numerical representation defining a description of the feature and a location of the feature in the data. To identify objects, the feature extraction unit 102, may be trained to extract features indicative of respective objects. To differentiate objects, the feature extraction unit 102 also be trained to extract features indicative of boundaries of the objects. For example, the feature extraction unit 102 may use various edge detection techniques to determine a boundary for each object.

The classification unit 104 is operable to receive features from the feature extraction unit 102, and apply the features to a model that identifies objects detected in the image. The model is a mathematical representation of a real-world process, for example, recognizing different objects in an image. The classification unit 104 uses the model to identify each object in the data, including any water. The model detects sets of features that are indicative of respective objects. Based on a respective set of features, the model identifies each object in the data. For example, the model may determine that based on a set of features, that an object described in the data is water. The classification unit 104 may also identify, boats, swimmers, rigs, islands, aquatic life, land, vegetation, and other objects in the data. In most instances, the data will not expressly identify objects; however, it is understood that this may not always be the case. For example, the data may be a nautical map that designates an area as water, land, or another object. In these instances, the classification unit 104 may proceed to determine a volume of the designated water.

If the classification unit 104 identifies water, it is further operable to determine the boundary of the water. The classification unit 104 is configured to determine a boundary between objects using the edge-related features. Boundaries may include boundaries between water and land, or boundaries between water and a man-made object, such as a boat or dock or other division between objects. By determining a boundary (real or abstract) of the water, the classification unit 104 may calculate a surface area of the body of water. The surface area may be used in a calculation of a volume of water. The surface area may also be used to determine if the body of water is accessible to an aircraft. In the instance that the classification unit 104 identifies a floating object on or near a surface of the water, it is operable to include a surface area of the object with the surface area of the body of water when determining a volume, but exclude the surface area of the object when determining whether the water is accessible. It is understood that in some instances, the data may only describe water as no other objects are present, for example, if the data was captured over an ocean. In these instances, the classification unit 104 need not determine an actual boundary of all the water; rather, it may impose an artificial boundary around a portion of the detected water.

The classification unit 104 is further configured to determine a depth of the water. The classification unit 104 may use three-dimensional data generated by the sensors 108 to determine a depth of the water. For example, the classification unit 104 can calculate a distance between the surface layer under the water and a surface of the water to determine a depth of the water. In other embodiments, the classification unit 104 may apply statistical methods to estimate a depth of the water. By performing a calculation using the sensor-based data, the classification unit 104 is operable to provide real-time estimated depth that accounts for any undocumented increase or reduction in water levels.

Based on a comparison of the depth of the water and a minimum depth required for a bucket or snorkel, the classification unit 104, may determine a potential suitability of the water. If, for example, a depth of water is less than a required depth for a bucket or snorkel, the classification unit 104 may classify the area as unsuitable. If, however, a depth of water is greater than a required depth for a bucket or snorkel, the classification unit 104 may classify the area as potentially suitable. In certain situations, a detectable depth of water is less than an actual depth of the water. For example, an aircraft may be flying over an ocean, or lake in which particles in the water reduce the maximum detectable depth. In these situations, the classification unit 104 may assign an artificial depth based on the maximum detectable depth of the water. The classification unit 104 may then determine suitability based on the artificial depth. It should be appreciated that the techniques used to capture data from under a water's surface may also be used to capture data through other back-scattering mediums, such as fog or smoke during a fire.

The classification unit 104 may further calculate a volume of the water. The classification unit 104 may select a boundary for a portion of the surface area of the water. The classification unit 104 may then calculate a volume of water below the selected boundary. Various methods may be used to calculate the volume of water. In some embodiments, the classification unit 104 calculates the volume through three-dimensional integration techniques. In other embodiments, the classification unit 104 determines whether the area under the bounded surface area generally resembles a three-dimensional shape, such as a cylinder or a cube. The classification unit 104 then calculates the volume of the shape without considering the contour of the surface layer under the water. The classification unit 104 also identifies objects submerged in the water, for example, aquatic life, swimmers, underwater vessels. If the classification unit 104 identifies a submerged object, it may exclude a volume of the submerged object from the calculated volume of the water.

The classification unit 104 determines a suitability of the location based on the calculated volume. If the calculated volume is less than the minimum required volume, the classification unit 104 can classify the area as unsuitable for refilling the bucket or snorkel 508. If, however, the calculated volume is greater than then minimum required volume for the bucket or snorkel 508, the classification unit 104 classifies the area as suitable.

In addition to determining a volume of water, the classification unit 104 may determine an optimal location for filling over a body of water. As described above, water transporting aircraft are typically fitted with a bucket or a tank for holding water. If the aircraft uses a bucket, the aircraft needs a length of water with a minimum depth to submerge a portion of a lip of the bucket and force water into the bucket. In the case of a tank, a snorkel 508 connected to the tank must descend into the water for a minimum depth to receive any water. In each case, the water retrieving apparatus (bucket or snorkel 508) needs a minimum depth of water to extract water. Therefore, based on the depth data, the classification unit 104 may determine a location over the water to direct the aircraft. The classification unit 104 may further consider additional parameters, such as a proximity of the aircraft to an object, for example, aquatic life, boats, people, or other potential objects in the path of an aircraft. The classification unit 104 may rank a first location as more suitable than a second location based on these considerations. For example, a proximity of an aircraft to boats or trees may be less desirable than an open expanse of water. Additionally, the classification unit 104 may use the data to determine a location that avoids submerged objects such as large aquatic life or groups of aquatic life.

The classification unit 104 may further use the sensor-based data to optimize a flight path or hovering position of the aircraft. The sensors 108 are operable to collect data related to water characteristics and environmental characteristics. In addition to collecting data to generate spatial coordinates, the sensors 108 may gather time-series data, and apply the data to a model to predict a future condition. For example, the aircraft may be equipped with optical and or thermal sensors to remotely detect water or environment phenomena, such as currents, temperature, or wind. The phenomena data may be used in conjunction with the spatial coordinates to detect not only a present position of a phenomena, but to predict a future position of the phenomena. For example, the classification unit 104 consider a position of a current in relation to a distance of the aircraft, and predict a position of the current at a time approximate to the arrival of the aircraft. The classification unit 104 may then determine an optimal flight path or location, based at least in part on the predicted position of the current.

The optimization may be based on various parameters, for example, a position-based optimization, time-based optimization, and performance-based optimization. The classification unit 104 is operable to calculate optimization parameters at more than one area of a body of water and make a comparison of suitability based on the one or more parameters. For example, the classification unit 104 may determine that more than one area of the water has a sufficient depth and volume of water. The classification unit 104 may further collect time-series data to predict a velocity and position of a current in the water. The classification unit 104 may further determine any obstructions such as trees or man-made objects that may impede an aircraft. Based on this data, the classification unit 104 may select one area of the water over another area of the water. After and during each water retrieval, the classification unit 104 may receive sensor-based data associated with performance characteristics of the retrieval. For example, the characteristics may include an amount of water retrieved, time of flight from sensing suitable water to retrieval of a threshold amount of water, time of flight between retrieving a threshold amount of water and returning to a fire, any force applied to the aircraft as a result of the retrieving apparatus (bucket or snorkel 508) interacting with the water. The classification unit 104 may further make predictions as to characteristics detected for an unselected area of water. For example, if the classification unit 104 detects multiple suitable areas at a body of water, the classification unit 104 may use collected sensor-based data from each unselected area to predict retrieval characteristics at those unselected areas. The classification unit may then determine whether an unselected area would have been a more efficient choice than the selected area in terms of time, impact on aircraft, and the volume of water retrieved. The classification unit 104 may then use the collected data and the predicted data to modify the model used to select the area of water to further optimize the water retrieval process.

The classification unit 104 may also consider the other characteristics of the water in relation to the water retrieving mechanism. The feature extraction unit 102 may extract features related to the characteristics of the water itself. The features may be related to, for example, a velocity of a current, a turbulence of the water, a temperature of the water, and other water characteristics. Each water characteristic may affect the speed and efficiency at which an aircraft is able to draw water. Furthermore, the characteristics may affect different mechanisms for drawing water differently. For example, the turbulence of the water may have a minimal impact on a bucket style retrieval mechanism. However, water turbulence may have a large effect on pumping water through a snorkel 508 and into a tank. Therefore, classification unit 104 may apply specific features to specific models based on the water retrieving mechanisms of an aircraft.

The feature extraction unit 102 is in operable communication with a plurality of sensors 108 that provide the real-time data of an aircraft's surroundings. The sensors 108 may be disposed on or about the aircraft 500, for example, on an airframe of an aircraft. The sensors 108 may also capture terrain-related data, as well as environmental-related data. Environmental data includes data from the ambient environment surrounding an aircraft. The environmental data may be, for example, wind velocity, wind direction, and temperature. The sensors 108 may capture signals across the electromagnetic spectrum and may include, but are not limited to, light detection and ranging (LIDAR) sensors, sonar systems, visible image capturing devices, radar, spectral sensors, microphones, force sensors, and a combination thereof. Additionally, various techniques can be employed by the classification unit 104 to generate three-dimensional data from under a body of water's surface. These techniques include, but are not limited to, stereo vision, triangulation, time of flight, structure from motion, structured light, laser stripe, and laser line scanning.

In some embodiments, the sensors 108 include LIDAR-based sensor system. LIDAR is an active remote sensing technique that can be used to survey a terrain that is proximate to an aircraft. Data collected from the sensors 108 can be used in combination with geolocation data to create real-time three-dimensional data including point clouds, topographical models, and maps of surface terrain.

A LIDAR system is operable to emit pulses of light from a laser (not shown) and detect, via an image capturing device (not shown), light reflected from a point on the terrain. The classification unit 104 is operable to calculate time measurements from the light being emitted from the laser and reflected light being received by the sensor 108. The classification unit 104 is further operable to receive position and orientation information from the geolocation unit 106. The classification unit 104 then uses the time measurements and geolocation of the aircraft to determine a distance between the aircraft and the terrain. Using a distance of each reflection point on the terrain from the aircraft, the classification unit 104 is further operable to create three-dimensional data describing a surface of the terrain. In an exemplary embodiment, the three-dimensional data may be in the form of a point cloud. A point cloud is a data set representing the x, y, and z spatial coordinates describing the terrain.

The LIDAR system can transmit a signal that pierces the surface of the water to detect any submerged objects as well as a surface layer under the water. To generate a light pulse optimal for piercing the surface of the body of water, the LIDAR system may modify a wavelength of the light pulses to account for effects on the light signal caused by the water. The light pulse with the modified wavelengths pierce the depth of the water and are reflected back towards the aircraft. The reflected signals received can be used to create three-dimensional data from below the surface of the body of water. For example, the point cloud may include spatial coordinates for the water's surface and the surface layer under the water. The point cloud may further include spatial coordinates describing a position and shape of natural or man-made objects submerged under the water.

The system 100 is also configured to receive information from a database 112 via a communication network 110. The database 112 may include, but not be limited to, terrain and information terrain maps, aeronautical navigation charts, drought conditions, and weather reports. The database 112 may include one or more external databases that gather and store terrain based and/or environmental information. The information in the database may not be as current as the information gathered by the sensors 108. Therefore, the data from the database 112 may be used to augment rather than replace the data from the sensors 108.

A geolocation unit 106 may receive geospatial data to determine a location of the water in relation to the aircraft. In the instance that the body of water has sufficient volume, the location data for the body, the geolocation unit 106 water may translate the location of the water in relation to the aircraft to flight control commands to direct the aircraft. The geolocation unit 106 may receive location-based data from a number of sources, including metadata embedded in the data from the sensors 108 or the database 112, a global positioning satellite system, inertial measuring units, or an inertial navigation system.

Figure 2:
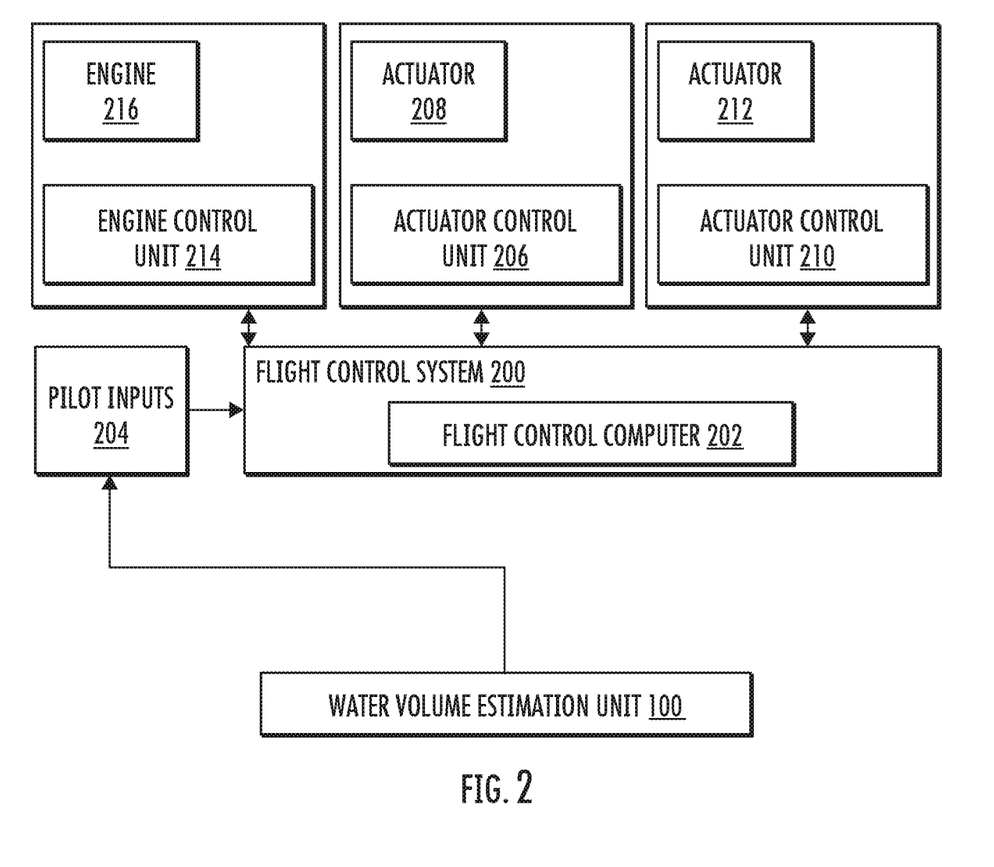
FIG. 2 depicts a flight control system, in accordance with an exemplary embodiment.
Figure 5:
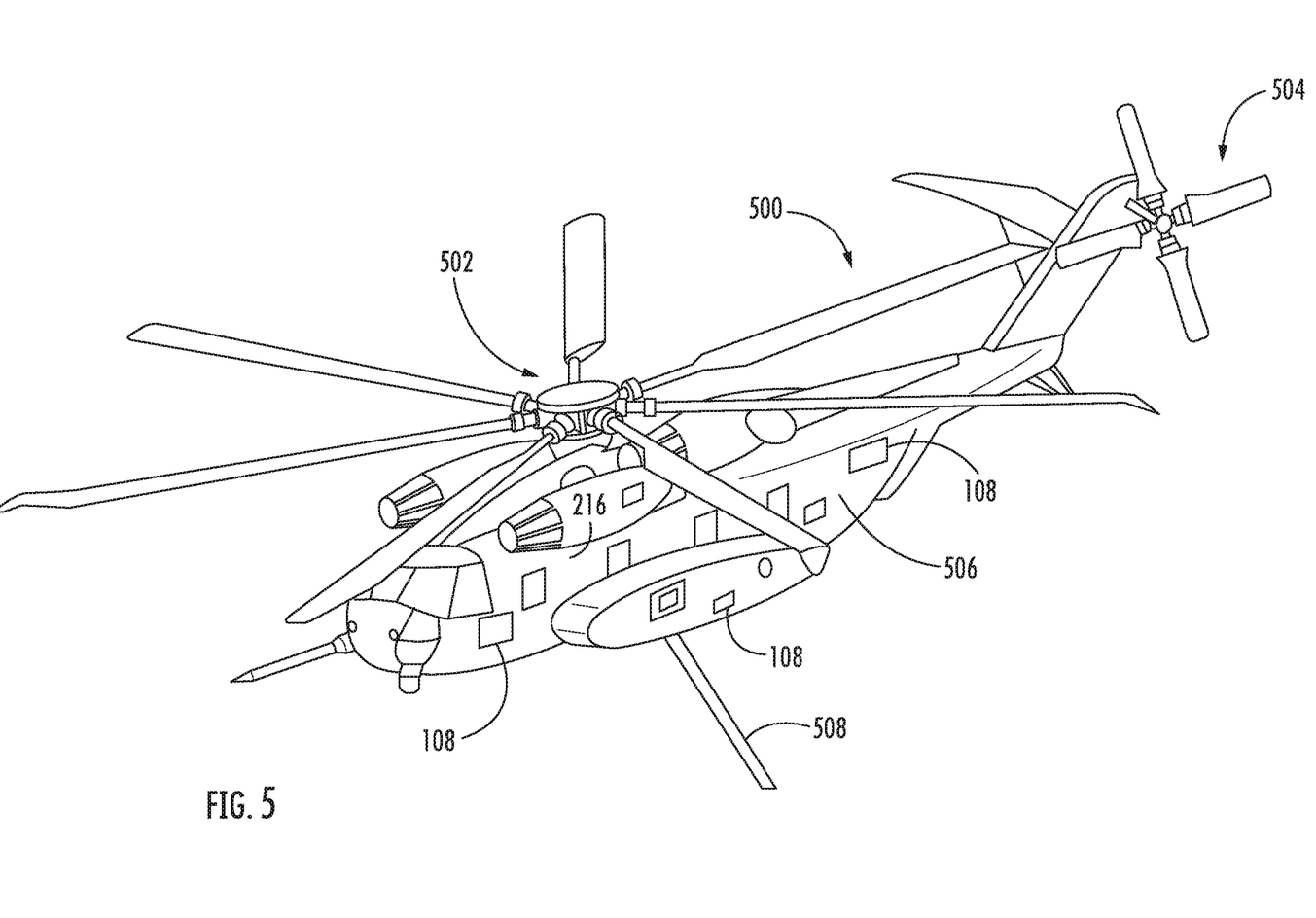
FIG. 5 depicts a rotary-wing aircraft in accordance with an exemplary embodiment.

Portions of an aircraft 500, such as the main rotor system 502 and the tail rotor system 504, for example, are driven by the flight control system 200. In some embodiments, the flight control system 200 is a fly-by-wire (FBW) control system. In an FBW control system, there is no direct mechanical coupling between a pilot's controls and movable components or control surfaces, such as rotor blade assemblies. Instead of using mechanical linkages, an FBW control system includes a plurality of sensors 108, which can sense the position of controlled elements and generate electrical signals proportional to the sensed position. The sensors 108 may also be used directly and indirectly to provide a variety of aircraft state data to a flight control computer (FCC) 202. The FCC 202 may also receive inputs from the water volume estimation system 100 that are translated into control commands to control the lift, propulsive thrust, yaw, pitch, and roll forces and moments of the various control surfaces of the aircraft 500. The FCC 202 may also receive pilot inputs 204 to control various movements of the aircraft 500. Pilot inputs 204 can be in the form of stick commands and/or beeper commands to set and incrementally adjust reference values for controllers. The pilot inputs 204 need not be directly provided by a human pilot, but may be driven by an automatic pilot, a remote control, a navigation-based control, or one or more outer control loops configured to produce one or more values used to pilot the aircraft 500. The pilot inputs 204 can provide autonomous control of the aircraft 500 without human intervention (thereby flying as an autonomous aircraft) and/or enable the aircraft 500 to be an optionally piloted vehicle.

In response to inputs from the system 100, the pilot inputs 204 are transmitted to the FCC 202. The FCC 202 transmits signals to various subsystems of the aircraft 500, such as the main rotor system 502 and the tail rotor system 504. The main rotor system 502 can include an actuator control unit 206 configured to receive commands from the FCC 202 to control one or more actuators 208, such as a mechanical-hydraulic actuator, for the main rotor blades. The tail rotor system 504 can also include an actuator control unit 210 configured to receive commands from the FCC 202 to control one or more actuators 212, such as a mechanical-hydraulic actuator, associated with the tail rotor blades.

In response to pilot inputs 204, the FCC 202 can also interface with an engine control unit (EECU) 214 for controlling an aircraft's engine 216. An EECU 214 may be a digital electronic control unit such as Full Authority Digital Engine Control (FADEC) electronically interconnected to a corresponding engine 216. Each engine 216 may include one or more instances of the EECU 214 to control engine output and performance. The engines 216 may also be commanded in response to the pilot inputs 204, such as a throttle command.

Figure 3:
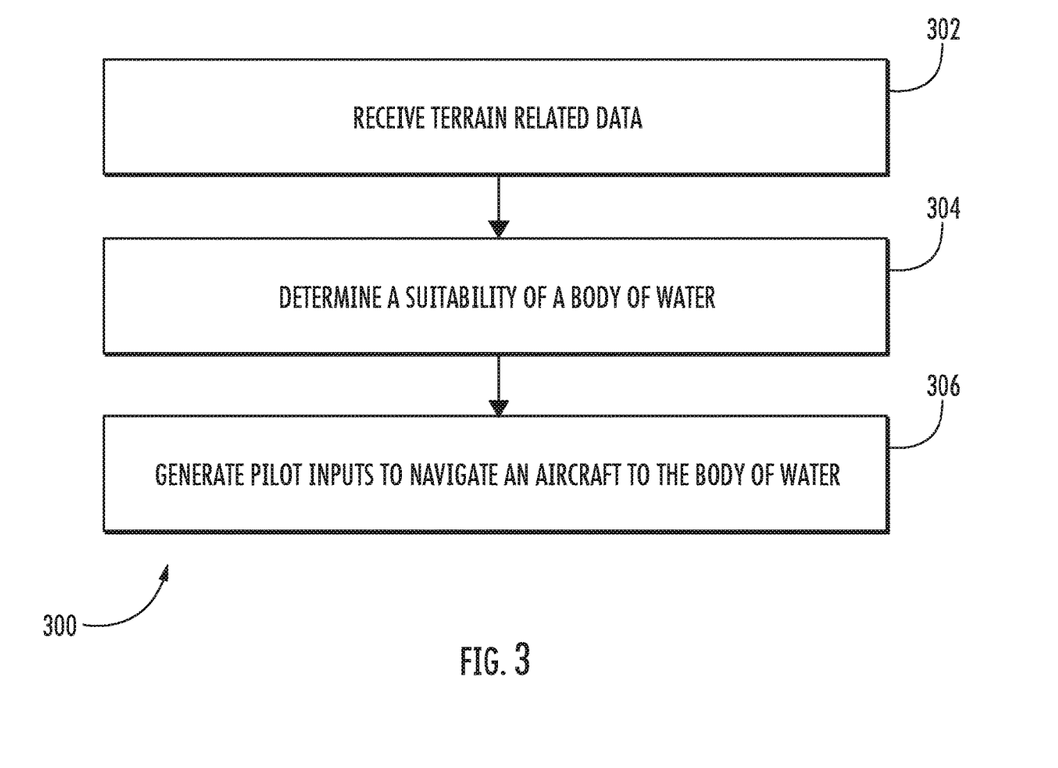
FIG. 3 depicts a process flow for water volume estimation, in accordance with an exemplary embodiment.

Referring to FIG. 3 a flow diagram 300 for a method for determining a suitable body of water is shown. The method 300 may be implemented by a computing system described in FIG. 4. At block 302, data describing a terrain is received. The data may in the form of sensor-based data that is continuously being received and updated or data from a database, for example, an image or a map of a target location. A system may be configured to activate based on detecting a threshold distance of the aircraft to a target event, for example, a fire. At block 304, the data is analyzed to determine whether a body of water includes a threshold volume to fill a bucket or a tank. In addition to being a sufficient volume of water, the accessibility of water to an aircraft is determined. For example, the presence of too many boats or a proximity to a tree line that is closer than a minimum safe distance for an aircraft may disqualify a body of water. At block 306, pilot inputs are generated to direct an aircraft to a suitable body of water. The pilot inputs may take into consideration an optimal approach of an aircraft to a body of water. In generating an optimal approach, various considerations such a water depth, water flow, and direction back to a target event may be considered.

Figure 4:
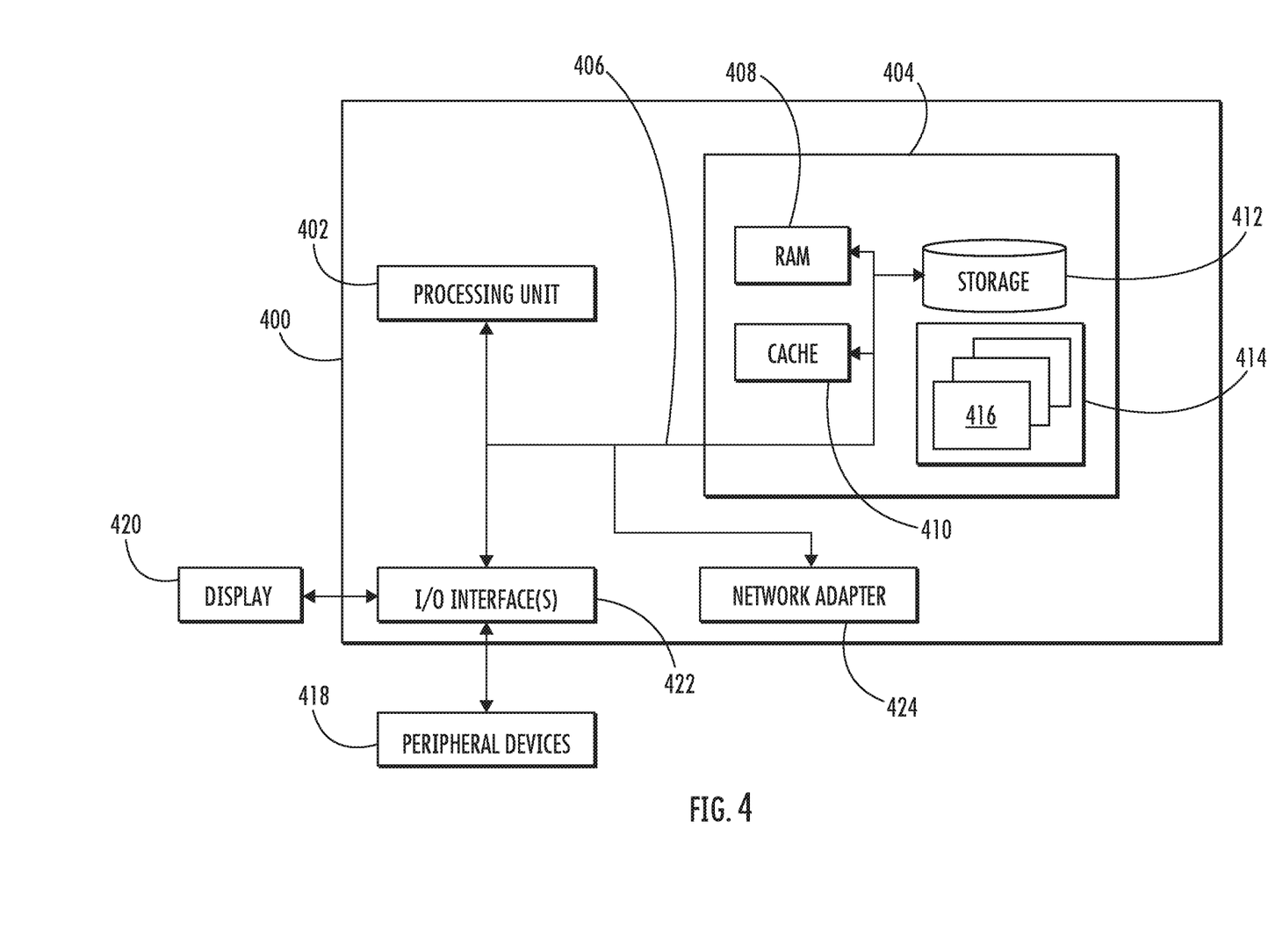
FIG. 4 depicts a computer system, in accordance with an exemplary embodiment.

FIG. 4 depicts a schematic of an example computing system 400 having functions and features utilized according to one or more embodiments. The computer system 400 can be operational with numerous other general purpose or special purpose computing system environments or configurations. The computer system 400 can be representative of various types of computer systems on which operations and functions can run in the aircraft 500. The functions and capabilities of computing system 400 can be utilized to implement one or more features of the water volume estimation system 100.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

The components of computer system 400 may include, but are not limited to, one or more processors or processing units 402, a system memory 404, and a bus 406 that couples various system components including system memory 404 to processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 400 typically includes a variety of computer system readable media. Such media may be any available media that is accessible by computer system 400, and it includes both volatile and non-volatile media, removable and non-removable media. The system memory 404 can include computer system readable media in the form of volatile memory, such as random access memory (RAM) 408 and/or cache memory 410. Computer system 400 may further include other removable/non-removable, volatile/non-volatile computer system storage media. By way of example only, storage system 412 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 406 by one or more data media interfaces. Memory 404 may include at least one program product having a set (e.g., at least one) of program modules that are configured to carry out the functions of embodiments.

Program/utility 414, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments as described herein.

Computer system 400 may also communicate with one or more external devices 418 such as a keyboard, a pointing device, a display 420, etc.; one or more devices that enable a user to interact with computer system 400; and/or any devices (e.g., network card, modem, etc.) that enable computer system 400 to communicate with one or more other computing devices. Such communication can occur via Input/Output (I/O) interfaces 422. Still yet, computer system 400 can communicate with one or more networks such as a local area network (LAN), a general wide area network (WAN), and/or a public network (e.g., the Internet) via network adapter 424. As depicted, network adapter 424 communicates with the other components of computer system 400 via bus 406. It should be understood that although not shown, other hardware and/or software components could be used in conjunction with computer system 400. Examples, include but are not limited to: microcode, device drivers, redundant processing units, external disk drive arrays, RAID systems, tape drives, and data archival storage systems, etc.

Referring now to the drawings, FIG. 5 illustrates a general perspective view of an exemplary vehicle in the form of aircraft 500 for use with a water detection system in accordance with an embodiment of the invention. In an embodiment, aircraft 500 is an optionally piloted vehicle and can autonomously perform required operations as it performs a water volume estimation function. In certain embodiments, aircraft 500 can be any suitable aircraft, including fixed wing, rotary wing aircraft, etc. The aircraft 500 includes an airframe 506, an engine 216, and a plurality of sensors 108. In some embodiments, the aircraft 500 may optionally include a snorkel 508 connected to a tank (not shown), and in other embodiments it may include a bucket (not shown).

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method comprising:
   detecting, by a computing system comprising one or more processors coupled with memory, water based at least in part on sensor-based data;
   determining, by the computing system via a feature extraction unit trained to extract features, a volume of the water based at least in part on the sensor-based data;
   determining, by the computing system, that the volume of the water determined via the feature extraction unit is greater than or equal to a threshold capacity of a water storage reservoir on an aircraft;
   determining, by the computing system responsive to the determination that the volume of the water is greater than or equal to the threshold capacity, a location at the water that is suitable for the aircraft to retrieve water via a water retrieving apparatus; and
   translating, by the computing system responsive to the determination of the location at the water that is suitable and that the volume of the water is greater than or equal to the threshold capacity, the location of the water into pilot inputs to cause the aircraft to navigate to the location at the water to retrieve at least a portion of the water via the water retrieving apparatus of the aircraft.

2. The computer-implemented method of claim 1, further comprising:
  comparing, by the computing system, the determined volume to the threshold capacity of the water storage reservoir on the aircraft; and
  determining, by the computing system, the location based on the volume exceeding the threshold capacity of the water storage reservoir.

3. The computer-implemented method of claim 1, further comprising:
  receiving, by the computing system, the sensor-based data from a sensor arranged on the aircraft.

4. The computer-implemented method of claim 1, further comprising:
  detecting, by the computing system, a distance between the aircraft and a fire; and
  activating the computing system based on the distance being less than a threshold distance to the fire.

5. The computer-implemented method of claim 1, wherein the water retrieving apparatus comprises a snorkel.

6. The computer-implemented method of claim 1, wherein the location is based at least in part on a characteristic of the water.

7. The computer-implemented method of claim 1, wherein the location is based at least in part on a depth of the water.

8. The computer-implemented method of claim 1, further comprising:
  extracting, by the computing system, a water-related feature from the terrain-related data; and
  applying, by the computing system, the water-related feature to a model to detect the water.

9. The computer-implemented method of claim 1, wherein the sensor-based data is generated by a light detection and ranging-based sensor.

10. An aircraft comprising:
  a main rotor system;
  a flight control system for controlling the main rotor system;
  an airframe;
  a memory having computer readable instructions; and
  one or more processors for executing the computer readable instructions, the computer readable instructions controlling the one or more processors to perform operations comprising:
    detecting water based at least in part on sensor-based data;
    determining, via a feature extraction unit trained to extract features, a volume of the water based at least in part on the sensor-based data;
    determining that the volume of the water determined via the feature extraction unit is greater than or equal to a threshold capacity of a water storage reservoir on the aircraft;
    determining, responsive to the determination that the volume of the water is greater than or equal to the threshold capacity, a location at the water that is suitable for the aircraft to retrieve the water via a water retrieving apparatus; and
    translating, responsive to the determination of the location at the water that is suitable and that the volume of the water is greater than or equal to the threshold capacity, the location of the water into pilot inputs for the flight control system to cause the aircraft to navigate to the location at the water to retrieve at least a portion of the water via the water retrieving apparatus of the aircraft.

11. The aircraft of claim 10, the operations further comprising:
  comparing the determined volume to the threshold capacity of the water storage reservoir on the aircraft; and
  determining the location based on the volume exceeding the threshold capacity of the water storage reservoir.

12. The aircraft of claim 10, the operations further comprising:
  receiving the sensor-based data from a sensor arranged on the airframe.

13. The aircraft of claim 10, the operations further comprising:
  detecting a distance between the aircraft and a fire; and
  activating the one or more processors to perform the operations based on the distance being less than a threshold distance to the fire.

14. The aircraft of claim 10, wherein the water retrieving apparatus comprises a snorkel.

15. The aircraft of claim 10, wherein the location is based at least in part on a characteristic of the water.

16. The aircraft of claim 10, wherein the location is based at least in part on a depth of the water.

17. The aircraft of claim 10, the operations further comprising:
  extracting a water-related feature from the terrain-related data; and
  applying the water-related feature to model to detect the water.

18. The aircraft of claim 10, wherein the sensor-based data is generated by a light detection and ranging-based sensor.

19. The aircraft of claim 10, wherein the pilot inputs are based at least in part on a type of water retrieving apparatus.

20. The aircraft of claim 10, the operations further comprising:
  controlling, by the flight control system, the main rotor system based at least in part on the pilot inputs.

* * * * *